May 12, 1964  D. F. SIDDALL  3,132,846
BLENDING APPARATUS
Original Filed Jan. 25, 1960  2 Sheets-Sheet 1

INVENTOR
DON F. SIDDALL
BY
ATTORNEY

May 12, 1964 D. F. SIDDALL 3,132,846
BLENDING APPARATUS
Original Filed Jan. 25, 1960 2 Sheets-Sheet 2
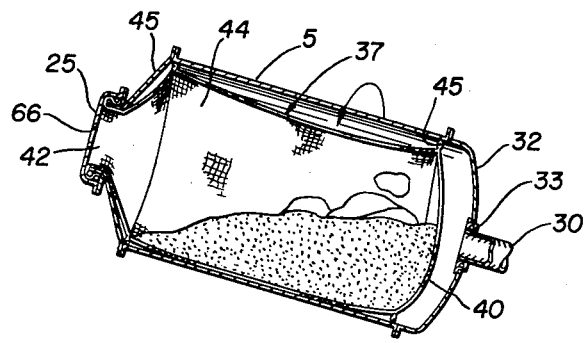
FIG. 3
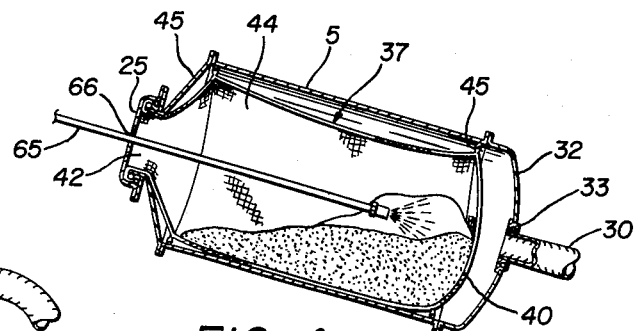
FIG. 4
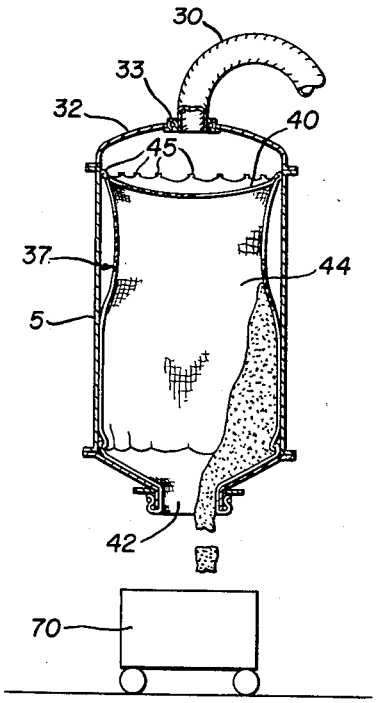
FIG. 5
FIG. 6
INVENTOR
DON F. SIDDALL
BY Gordon C. Leach
ATTORNEY

United States Patent Office 3,132,846
Patented May 12, 1964

3,132,846
BLENDING APPARATUS
Don F. Siddall, Akron, Ohio, assignor to The United States Stoneware Co., Tallmadge, Ohio, a corporation of Ohio
Original application Jan. 25, 1960, Ser. No. 4,424, now Patent No. 3,043,557. Divided and this application Feb. 21, 1962, Ser. No. 174,778
7 Claims. (Cl. 259—3)

This invention relates to apparatus for blending a liquid, such as a plasticizer, with a finely divided resin, such as a vinyl resin.

It is recognized that if shearing forces are applied to resins such as vinyl resins, when the plasticizer is added, and the mixture is at a temperature above the deformation temperature of the resin, such as is customary when plasticizer is mixed with a resin in so-called ribbon mills and the usual blenders, the resin tends to paste or agglomerate. This is overcome in the process of the present invention.

In operating the apparatus of this invention the plasticizer is added to the resin and tumbled in a container without the application of a shearing force or pressure. The tumbling exposes different particles of the resin to the plasticizer as it is applied as a spray or mist, and the two are thus thoroughly intermixed. However, if the tumbling is carried out in an ordinary vessel there is a tendency for the resin to adhere to the wall of the vessel. The resin is contained in a bag-like structure, and the bag walls are flexed during the tumbling operation to prevent deposits of the resin-plasticizer mixture from collecting on the bag. Such deposits are objectionable because they are of non-uniform composition and are larger than the particles from which they are formed. By continuously flexing the walls, any adhering resin-plasticizer mixture is immediately separated from the walls and returned to the finely powdered mass within the container.

The walls of the bag are preferably air pervious, so that a hot gas (preferably hot air) can be passed through the bag to heat the tumbling mass of the resin-plasticizer mixture to facilitate the absorption of the plasticizer by the resin. Cold air or other cold gas can be similarly employed to cool the plasticizer-resin mix after its preparation is completed.

The resin-plasticizer mixture adheres to a cotton bag, and such adherence is not broken by flexing the bag. But if the bag is made of smooth material, any deposit is easily separated by flexing the bag. If an air-pervious bag is required, so that a gas can be blown through it into contact with the tumbling resin-plasticizer mixture, the bag is advantageously woven from strands composed of extruded filaments. Woven glass fabric has proven satisfactory. Fabric woven from strands of extruded monofilaments of organic plastics, such as nylon, Dacron (polyethylene terephthalate), etc. have proven satisfactory and can be used if inert with respect to both the resin and the plasticizer. If no gas is to be passed through the bag it need not be porous and can be fabricated from extruded or cast film or coated fabric.

If the resin-plasticizer mixture is to be heated by a gas, the bag is preferably fastened inside of a rigid conduit, which may be a generally cylindrical container. Preferably, the mixture never makes contact with the container. The walls of the bag are porous and the heated gas is passed into the outer container near one end and is vented from near the other end. In transit through the outer container the gas enters the bag and comes into intimate heat-interchanging relation with the tumbling mass of the resin-plasticizer mixture. The mouth of the bag may be held in an opening at one end of the container, and the gas is then preferably introduced into the bag through the wall of the bag near its opposite end. The used gas can be vented through the mouth of the bag, but if the mouth of the bag is closed it will escape through vents provided in the outer container near the mouth of the bag.

The outer container is advantageously mounted with its axis tilted and it is rotated about this axis to tumble the bag and its contents. The bag is attached to the inner wall of the container at separated locations, preferably near its top and bottom, and it hangs limp within the container. As the container rotates, what is the top of the bag is continuously changing and is always loose and sags from the points of attachment. The slack of the bag walls changes constantly and the walls are constantly flexed and dislodge any particles of the resin-plasticizer mixture that tend to adhere to them. With each complete revolution the complete sidewall of the bag has been given the slack, sagging treatment which prevents accumulation of the plasticized resin on its inner wall. The bag is preferably fastened to the container so that its top and bottom are similarly flexed.

Suitable spray means is provided within the bag for the introduction of the plasticizer. This is advantageously attached to a pipe that passes through the closure for the opening in the container. It may be fastened to this closure, or it may be inserted through an opening in the closure.

Thus the resin-plasticizer mixture is tumbled as the plasticizer is added, and the entire mass is advantageously heated by a current of gas passed through it while it is tumbled. Such heating avoids local overheating which occurs when heat is transmitted through the container wall. This method of heating by a gas, lessens any tendency for the resin-plasticizer mixture to adhere to the wall surface, and any mixture which tends to adhere to the wall is quickly separated by the flexing of the wall.

The invention will be further described in connection with the accompanying drawings, in which—

FIG. 3 is a sectional view of the outer container with the inner container and contents;

FIG. 4 is a similar view with the spray equipment inserted in the container;

FIG. 5 shows the container in the upright position as it is being unloaded; and

FIG. 6 is a detail showing how the bag is fastened in the container.

Figure 1:
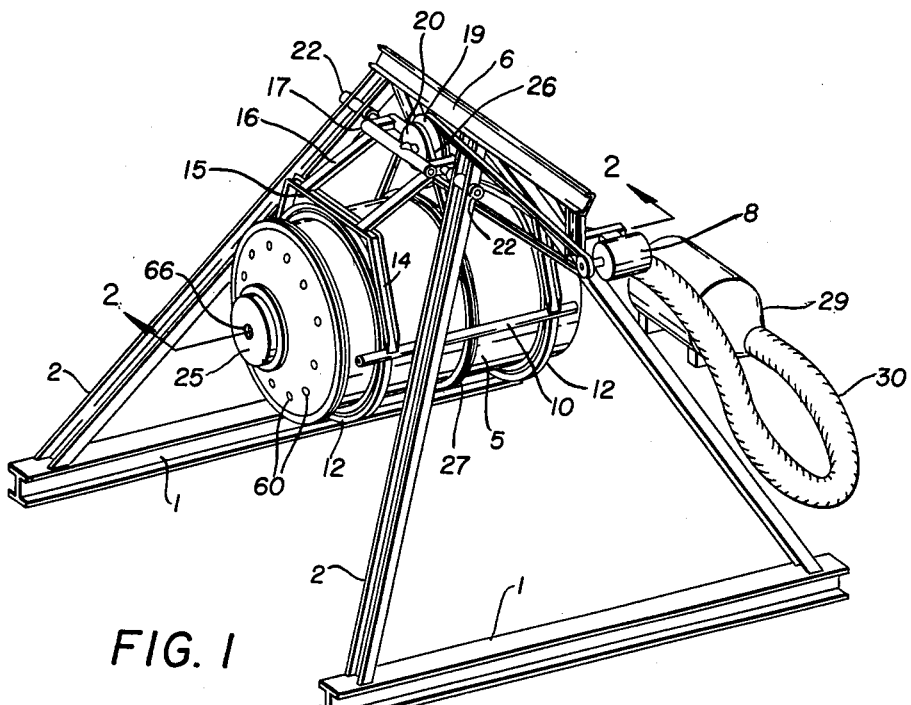
FIG. 1 is a view in perspective of the tumbling apparatus, including the frame on which it is supported.

The frame which supports the container is formed of the two base members 1 and the angled supports 2 which slant inwardly toward the container 5. They are held in the correct position by the brace 6 which extends outwardly from one of the supports 2 to support the motor 8.

The bars 10 (FIG. 1) on each side of the container support the container in the circular ball bearings 12 in which the container rotates, and these bars 10 are held at a spaced distance from above by the angled braces 14 which include at their top the two horizontal members 15. These horizontal members are supported from above by the braces 16 which are connected to the two sides 17 of the rectangular member which supports the larger pulley 19 and smaller pulley 20 which rotate together. This rectangular member is pivoted at its ends at the pivots 22 in one side of the frame members 2. These pivots 22 are below the top of the frame and the container 5 is a sufficient distance below these pivots 22 so that the container can be swung to the vertical position with its opening at the bottom, as illustrated in FIG. 5. The container can be held manually in this position for discharge of its contents, or mechanical means may be provided to hold it there. The large pulley 19 is driven from the motor 8, and this drives the small pulley 20 which, in turn, drives the container through the belt 26 which operates in the pulley 27 on the outer surface of the container.

The heater 29 contains a blower which supplies air through the hose 30 into the bottom end 32 of the container. The end of the hose 30 is held by the roller ring 33 which permits rotation of the container as the hose remains stationary.

The container may be an ordinary steel drum with a suitable opening in the bottom to accommodate the hose 30, and a narrowed opening 34 at the opposite end which is closed by the cover 25.

The bag 37 is of rather closely knit fabric. A bag of woven small strands composed of extruded glass filaments has been found very satisfactory, but other porous fabrics can be used. Fabrics woven from nylon and Dacron are satisfactory, provided they are not chemically affected by the resin or the plasticizer. The following glass fabric has been found satisfactory:

Weave _____ Plain.
Weight _____ 6 to 7 oz. per sq. yd.
Thread count _____ 30 x 30 to 50 x 50.
Thickness _____ 0.012 to 0.015 inch.
Porosity _____ ASTM D-737-46, 20 to 50 c.f.m. per sq. ft.

The bag is closed at one end 40 and narrows at the neck 42 at the other end. The intermediate portion is formed with a cylindrical wall 44. Loops 45 attached to the bag at its bottom circumference and at the circumference where the neck joins the wall extend outwardly from the bag and are attached to hooks 47 (FIG. 6) on the inside of the container. The bag is held loosely within the container so that the cylindrical wall is limp and sags between the points of support.

The neck 42 of the bag is carried out through the ring 50 (FIG. 6) at the top of the container. Rings of rubber or other elastomer are used to hold the end of the neck against the outer wall of this ring 50. If the bag is of glass fabric it may be desirable to provide one ring 51 inside of the neck to prevent the bag from being bent at a sharp angle; the other ring 52 holds the end of the neck against the outer wall of the ring 50. The cover 25 is held in place by bolts 55.

To add plasticizer to the resin, a bag is inserted in the container and its neck is held over the ring 50 by rubber rings 51, 52 or the like. The resin is introduced into the bag with the container either in the horizontal position, or upended. The plasticizer is supplied through the pipe 65 which is equipped with a spray nozzle, all of which is inserted through the opening 66 in the cover 25 and held there manually or mechanically while the plasticizer is sprayed on to the tumbling contents of the bag. Alternatively, the spray means for the plasticizer may be permanently fastened to the inside surface of the cover 25.

The resin particles are somewhat larger than the openings in the mesh of the bag structure so that the resin is held in the bag. When a proper charge of the resin (for example a charge which fills the bag one-third to two-fifths full) has been put into the bag the cover 25 is put in place and the blower 29 is started, at approximately the same time the motor 8 is started. The weight of the hose tips the container to an angle of about 15 or 20 degrees, so that as the container rotates the resin is tumbled and thoroughly mixed. Means may be provided for maintaining the axis of the container at a desired angle, and this may vary with the size of the charge, etc.

The top wall of the bag sags and as the container rotates on its tilted axis, the portion of the bag which is at the top is continuously changed. The top of the bag, throughout its length, sags away from the container, and the portion which sags is continuously changed as the container rotates. Thus, every portion of the bag is flexed in each complete rotation of the container, and the portion of the bag which lies flat against the bottom of the container at one stage of the cycle, at another stage sags from points of attachment at opposite ends of the top side of the container. Any resin-plasticizer mixture that tends to deposit on the inner wall of the bag is almost immediately separated by the flexing of the bag.

Figure 2:
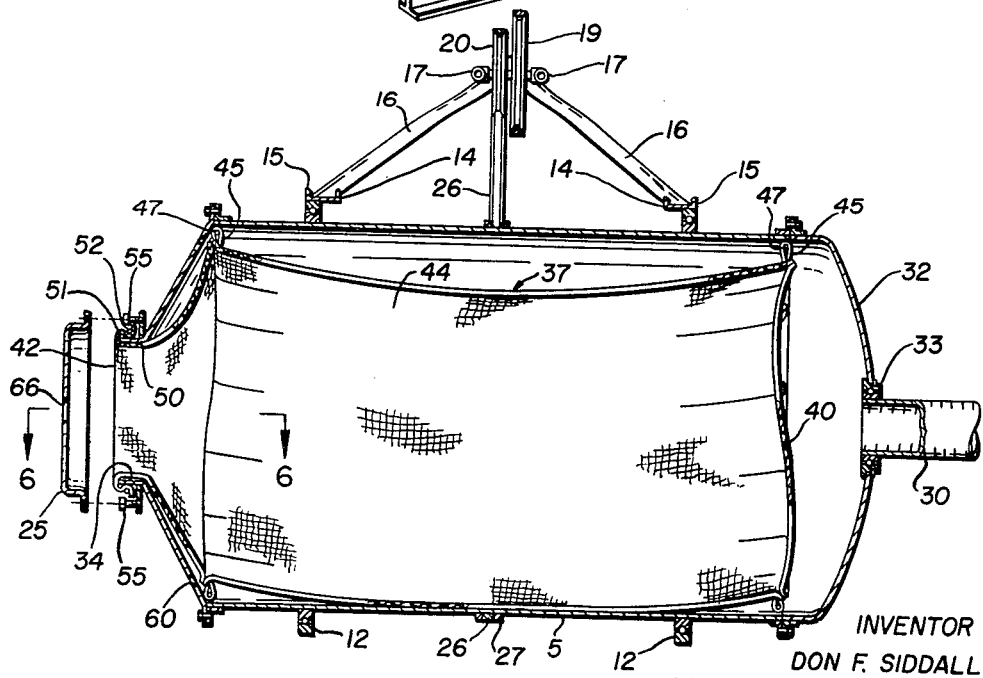
FIG. 2 is an enlarged side sectional view of the outer container with the bag fastened inside of it, and a portion of the support, on the line 2—2 of FIG. 1.

Heated air is blown through the container during the mixing. It enters the bag through its porous bottom and side walls, comes into intimate contact with the tumbling resin and heats it, and then is vented through the openings 60 which are shown in the tapered end of the container (FIGS. 1 and 2), although they can be located at any suitable place. The heated air may be at a temperature of from 300 to 600° F. as it enters the container. If the container has a capacity of 180 gallons, the air may advantageously be passed through the container at the rate of about 200 to 500 cubic feet per minute. However, the size of the container and the rate that air is passed through it are not critical. Where there is a larger charge it may be desirable to pass the air through the container at a higher rate of speed than where there is less resin present. The container is rotated about its axis at a rate of about 25 to 45 r.p.m., but this rate may be varied widely and is not critical.

A gas other than air can be used for heating, and a non-oxidizing gas such as nitrogen will be used on a resin-plasticizer mixture that oxidizes readily at elevated temperature. The gas is heated to facilitate absorption of the plasticizer by the resin, and any temperature may be used below that at which degradation sets in.

As the resin is heated to a temperature of, for example 200° F., plasticizer is introduced through the spray line 65. The spray should not form a mist so small that it is carried out through the outlets 60 by the current of gas which is continuously passing through the equipment. The plasticizer may, for example, be added at a rate of 1 to 5 gallons per minute per 100 pounds of plasticizer.

After the entire charge of plasticizer has been added, the tumbling is continued for a matter of a few minutes such as 10 minutes to complete the absorption of the plasticizer into the resin. The plasticizer pipe 65 is withdrawn from the container and the rotation of the container is stopped.

The following formula is illustrative:

| | Pounds |
|---|---|
| Vinyl resin (Geon 101) | 100 |
| Di-2-ethylhexyl phthalate | 75 |
| Barium-cadmium laurate | 2.5 |
| Titanium dioxide (finely divided) | 4 |

The following procedure is illustrative:

(1) With the blender (i.e. the container with the bag in it) stopped, add the resin and then the barium-cadmium laurate.
(2) Start up heater and blower, and start rotation of blender. In about 10 minutes the resin is heated to about 170° F.
(3) Add plasticizer to resin at a rate of 1 to 5 gallons per minute.
(4) Turn off heater when resin has reached temperature of about 220° F., in about 20–40 minutes after starting addition of plasticizer.
(5) Add titanium dioxide all at once; resin-plasticizer may be cooled with cold air to about 150° F. before this addition but this is not necessary.
(6) Tumble 2 to 6 minutes until titanium dioxide is thoroughly mixed; then upend blender as in FIGURE 5 to discharge product into truck 70 or other container.

The product can be screened or otherwise treated, and stored or used. It is desirable to let the product cool to about room temperature before storing. The resin can be heated before charging to the blender, so can the plasticizer, but this is not necessary. Eventually the product is extruded or otherwise converted into consumer goods.

The resin may be a homopolymer of vinyl chloride or a copolymer thereof with more or less of any of the monomers commonly copolymerized therewith such as vinyl acetate, vinylidene chloride, diethyl maleate, etc. The apparatus and process can be used in the plasticization of other resins, as for example homopolymers of vinyl acetate, etc.

The plasticizer used is not critical to the satisfactory operation of the process. Any of the usual plasticizers may be used with the different plastics. Plasticizers for the vinyl resins include, for example, acetyl tributyl citrate, butylphthallyl butyl glycollate, dibutyl sebacate, di-iso-butyl adipate, dicapryl phthalate, dioctyl phthalate, di-2-ethylhexyl phthalate, di-iso-octyl phthalate, dipropylene glycol dibenzoate, 2-ethylhexyl diphenyl phosphate, ethylphthallyl ethyl glycollate, polyesters, tricresyl phosphate, etc. The plasticizers may be used in any amount, for example, from 25 to 150 percent (more or less) based on the weight of the resin. The particular plasticizer, the particular plastic, and the amount of the plasticizer are not critical. A mixture of plasticizers can be used. More or less of the resin-plasticizer mixture can be treated at one time, the amount being sufficiently less than the bag will hold to permit the mixture to tumble and the bag to flex as the blender is rotated. Although rotation of the bag is the most efficient motion, other movements may be imparted to it to cause its contents to tumble. For instance, it may be shaken in such a way as to cause its walls to flex. Other liquids, such as stabilizers, etc. may be mixed with the plasticizers, and solids such as pigments, etc. may be suspended in the plasticizer before it is mixed with the resin. Such other liquids and solids may be mixed with the resin before the plasticizer is mixed with it or afterward.

The apparatus can be designed to make the process continuous. For instance, using a cylindrical drum tilted at a suitable angle and rotated at a suitable speed, the resin and plasticizer can be fed through metering means and supplied continuously to the lower end of the drum. The amount in the drum will be gradually increased, as it is tumbled, until it reaches a certain level, and be continuously discharged through an opening at the upper end. The resin may be supplied by blowing through a conduit which passes through said opening and extends to the lower end of the drum. The plasticizer, being liquid, can easily be supplied through a pipe extending through the opening.

The shape of the container and bag are not critical. Instead of being cylindrical the container may be triangular, square, hexagonal, etc. in cross section. Its walls need not be straight. Unless air or other gas is to be passed through the wall of the container to heat or otherwise treat the resin, the bag need not be porous, and heat may be supplied through the wall of the bag. In that case, greater flexing of the bag walls is required to detach any deposits than when heat is supplied by a heated gas passed through the bag wall.

The words "bag" and "container" are used herein to include a sheet liner the edges of which are overlapped without being united by stitching or the like.

This application is a division of my application Serial No. 4,424 filed January 25, 1960, now Pat. No. 3,048,557.

The invention is covered in the claims which follow.

What I claim is:

1. A blender which comprises a vessel formed of an impervious side wall and two end walls with an opening in each end wall, and a flexible gas-pervious bag fabricated of smooth material which bag is extended within the vessel by attachment thereto at spaced intervals so that it remains flexible and its volume is only slightly less than the volume of the vessel, with the mouth of the bag held in the open position in one of said openings.

2. The blender of claim 1, with spray means within the bag, and means for flexing the bag whereby the mixture within it does not adhere permanently thereto.

3. The blender of claim 1 in which the vessel is generally cylindrical and mounted on a tilted axis, and means is provided for rotating the vessel about an axis intermediate the two end walls.

4. Apparatus for the blending of a plasticizer with a finely divided plastic, which comprises a rigid elongated container with an opening in one end thereof, a closure in said opening with spray means associated with the closure and located within the container, means for supporting the container with its axis at a tilted angle with the opening up, and means for rotating the container about said axis, a flexible air-pervious bag fabricated of smooth material in the container with its mouth at said opening and the bag loosely extended in the container near the top and bottom thereof and with said spray means therein, and means for supplying air to the container near its bottom and venting air from the container near its top, and means for heating the air supplied to the container.

5. The apparatus of claim 4 which includes means for turning the container in the vertical plane through said axis to change the position of said opening to facilitate charging and unloading the bag.

6. A blender which comprises a bag with a smooth, porous, flexible wall and means for rotating the same about an axis, means within the bag for introducing a liquid into the bag, and means for passing a gas through the wall of the bag.

7. Apparatus for the blending of a liquid with a finely divided plastic, which comprises a rigid container and a flexible air-pervious bag fabricated of smooth material loosely extended in the container, with means including a blower for passing a gas through the container and thence into the bag, and means for flexing the bag whereby the mixture within the bag does not adhere permanently thereto.

References Cited in the file of this patent

UNITED STATES PATENTS

| | | |
|---|---|---|
| 503,556 | Solvay | Aug. 15, 1893 |
| 2,268,816 | Gabeler et al. | Jan. 6, 1942 |
| 2,603,832 | Clark et al. | July 22, 1952 |
| 2,711,557 | Russell | June 28, 1955 |
| 2,812,541 | Webster | Nov. 12, 1957 |
| 2,858,688 | Smith | Nov. 4, 1958 |
| 3,030,081 | Wilson et al. | Apr. 17, 1962 |